United States Patent
Zhang

(10) Patent No.: US 10,938,017 B2
(45) Date of Patent: Mar. 2, 2021

(54) OVERCHARGE PROTECTION ASSEMBLY FOR A BATTERY CELL

(71) Applicant: CPS TECHNOLOGY HOLDINGS LLC, New York, NY (US)

(72) Inventor: Xugang Zhang, Milwaukee, WI (US)

(73) Assignee: CPS TECHNOLOGY HOLDINGS LLC, New York, NY (US)

(*) Notice: Subject to any disclaimer, the term of this patent is extended or adjusted under 35 U.S.C. 154(b) by 212 days.

(21) Appl. No.: 16/312,859

(22) PCT Filed: Jul. 31, 2017

(86) PCT No.: PCT/US2017/044730
§ 371 (c)(1),
(2) Date: Dec. 21, 2018

(87) PCT Pub. No.: WO2018/026728
PCT Pub. Date: Feb. 8, 2018

(65) Prior Publication Data
US 2019/0334156 A1    Oct. 31, 2019

Related U.S. Application Data

(60) Provisional application No. 62/369,716, filed on Aug. 1, 2016.

(51) Int. Cl.
*H01M 2/34* (2006.01)
*H01M 10/647* (2014.01)
(Continued)

(52) U.S. Cl.
CPC ......... *H01M 2/345* (2013.01); *H01M 2/1241* (2013.01); *H01M 10/0525* (2013.01);
(Continued)

(58) Field of Classification Search
None
See application file for complete search history.

(56) References Cited

U.S. PATENT DOCUMENTS

| | | |
|---|---|---|
| 5,304,431 A | 4/1994 | Schumm, Jr. |
| 5,691,073 A | 11/1997 | Vu et al. |

(Continued)

FOREIGN PATENT DOCUMENTS

| | | |
|---|---|---|
| DE | 102012200868 A1 | 7/2013 |
| DE | 102014200202 A1 | 7/2015 |

(Continued)

OTHER PUBLICATIONS

International Search Report and Written Opinion for PCT/US2017/044730 dated Oct. 11, 2017, 14 pages.

*Primary Examiner* — Basia A Ridley
*Assistant Examiner* — Heng M. Chan
(74) *Attorney, Agent, or Firm* — Christopher & Weisberg, P.A.

(57) ABSTRACT

A battery module includes plurality of prismatic battery cells. Each prismatic battery cell includes a casing housing electrochemically active components and a cover assembly. The cover assembly includes a cover, a terminal protruding through the cover, a current collector electrically coupled to the terminal, and an overcharge protection assembly between the terminal and current collector. The overcharge protection assembly includes a spiral disk and a vent disk physically and electrically coupled, wherein the vent disk is between the spiral disk and the terminal and includes a concave structure forming a cavity between the vent disk and the terminal. The vent disk is configured to deform into the cavity and break when a pressure within the casing exceeds a threshold value. The spiral disk is configured to apply a shearing force to the vent disk when the vent disk (Continued)

deforms to facilitate the breakage to interrupt electrical current flow.

21 Claims, 7 Drawing Sheets

(51) Int. Cl.
  *H01M 2/12* (2006.01)
  *H01M 10/0525* (2010.01)
  *H02J 7/00* (2006.01)
(52) U.S. Cl.
  CPC ......... *H01M 10/647* (2015.04); *H02J 7/0029* (2013.01); *H01M 2200/20* (2013.01); *H02J 7/00302* (2020.01)

(56) References Cited

U.S. PATENT DOCUMENTS

| | | | |
|---|---|---|---|
| 5,707,756 A | 1/1998 | Inoue et al. | |
| 5,741,606 A | 4/1998 | Mayer et al. | |
| 5,766,791 A | 6/1998 | Takahashi et al. | |
| 5,879,832 A | 3/1999 | Vu et al. | |
| 5,985,479 A | 11/1999 | Boolish et al. | |
| 6,037,071 A | 3/2000 | Poirier et al. | |
| 6,204,635 B1 * | 3/2001 | Sullivan | H01M 2/1235 320/134 |
| 6,210,824 B1 | 4/2001 | Sullivan et al. | |
| 6,451,473 B1 | 9/2002 | Saito et al. | |
| 6,900,616 B2 | 5/2005 | Burrus, IV et al. | |
| 7,433,794 B1 | 10/2008 | Berdichevsky et al. | |
| 7,470,482 B2 | 12/2008 | Takamura et al. | |
| 7,601,455 B2 | 10/2009 | Yoon | |
| 7,642,008 B2 | 1/2010 | Kim et al. | |
| 7,749,642 B2 | 7/2010 | Chang et al. | |
| 7,763,375 B2 | 7/2010 | Igoris et al. | |
| 7,879,484 B2 | 2/2011 | Hyung et al. | |
| 8,216,707 B2 | 7/2012 | Byun et al. | |
| 8,409,736 B2 | 4/2013 | Wang et al. | |
| 8,435,660 B2 | 5/2013 | Kim et al. | |
| 8,512,895 B2 | 8/2013 | Byun et al. | |
| 8,623,548 B2 | 1/2014 | Kim et al. | |
| 8,632,911 B2 | 1/2014 | Byun et al. | |
| 8,940,422 B2 | 1/2015 | Ito et al. | |
| 8,951,663 B2 | 2/2015 | Km et al. | |
| 8,968,898 B2 | 3/2015 | Lee et al. | |
| 8,993,149 B2 | 3/2015 | Vu | |
| 9,012,050 B2 | 4/2015 | Byun et al. | |
| 9,099,732 B2 | 8/2015 | Kim et al. | |
| 9,190,636 B2 | 11/2015 | Kim et al. | |
| 9,252,400 B2 | 2/2016 | LePort et al. | |
| 9,257,686 B2 | 2/2016 | Kim et al. | |
| 9,324,990 B2 | 4/2016 | Han | |
| 9,425,453 B2 | 8/2016 | Han et al. | |
| 2006/0275657 A1 | 12/2006 | Kozuki et al. | |
| 2008/0220316 A1 | 9/2008 | Berkowitz et al. | |
| 2008/0254343 A1 | 10/2008 | Kaplin et al. | |
| 2010/0227217 A1 | 9/2010 | Fujikawa et al. | |
| 2010/0291422 A1 | 11/2010 | Deng et al. | |
| 2010/0314285 A1 * | 12/2010 | Rigobert | H01M 2/1241 206/703 |
| 2011/0052949 A1 | 3/2011 | Byun et al. | |
| 2011/0070467 A1 | 3/2011 | Meintschel et al. | |
| 2011/0217572 A1 | 9/2011 | Yebka et al. | |
| 2012/0258339 A1 | 10/2012 | Kim | |
| 2013/0040176 A1 * | 2/2013 | Tyler | H01M 4/70 429/89 |
| 2013/0266830 A1 | 10/2013 | Byun et al. | |
| 2013/0337297 A1 | 12/2013 | Lee et al. | |
| 2014/0205897 A1 | 7/2014 | Byun et al. | |
| 2014/0212741 A1 | 7/2014 | Kim | |
| 2014/0212743 A1 | 7/2014 | Kim | |
| 2014/0349152 A1 | 11/2014 | Guen | |
| 2014/0377601 A1 | 12/2014 | Kim | |
| 2014/0377603 A1 | 12/2014 | Eberle et al. | |
| 2015/0079432 A1 * | 3/2015 | Okuda | H01G 2/14 429/61 |
| 2015/0171411 A1 * | 6/2015 | Kobayashi | H01M 2/22 429/61 |
| 2015/0207132 A1 | 7/2015 | Minagata et al. | |
| 2015/0221927 A1 | 8/2015 | Lee | |
| 2015/0243960 A1 | 8/2015 | Imanishi et al. | |
| 2015/0270528 A1 | 9/2015 | Guen | |
| 2015/0295211 A1 | 10/2015 | Kim et al. | |
| 2015/0325833 A1 | 11/2015 | Harayama et al. | |
| 2016/0043356 A1 | 2/2016 | Sunada et al. | |

FOREIGN PATENT DOCUMENTS

| | | |
|---|---|---|
| EP | 0959508 A1 | 11/1999 |
| EP | 1076350 A2 | 2/2001 |
| EP | 2846380 A1 | 3/2015 |

* cited by examiner

OVERCHARGE PROTECTION ASSEMBLY FOR A BATTERY CELL

CROSS REFERENCE TO RELATED APPLICATIONS

This application is a U.S. National Stage Application under 35 U.S.C. § 371 of International Application No. PCT/US2017/044730 entitled "OVERCHARGE PROTECTION ASSEMBLY FOR A BATTERY CELL," filed on Jul. 31, 2017, which claims priority to and the benefit of U.S. Provisional Application Ser. No. 62/369,716, entitled "CURRENT INTERRUPT FOR LITHIUM ION PRISMATIC CELL," filed Aug. 1, 2016, which is hereby incorporated by reference in its entirety for all purposes.

BACKGROUND

The present disclosure relates generally to the field of batteries and battery modules. More specifically, the present disclosure relates to features of a battery cell that may protect a battery cell from thermal runaway during an overcharge event.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

Stationary battery systems may be viable alternatives or supplements to systems that operate based on fossil fuel combustion. Homes, offices, buildings, and similar locations, for instance, often include backup power sources such as gas-powered electrical generators used in the event of a central power failure (e.g., due to inclement weather). Similarly, certain settings, such as temporary offices, temporary housing, or other settings located remotely from a power grid, may not necessarily be tied to an electrical grid and may instead rely on a source of energy from a relatively portable source such as an engine-driven electrical generator. Stationary battery systems may be an attractive alternative for such settings not only because they can be discharged with relatively low emissions compared to combustion processes, but also because other sources of energy, such as wind and solar, may be coupled to such stationary battery systems to enable energy capture for later use.

As technology continues to evolve, there is a need to provide improved power sources, particularly battery modules, for such applications. For example, battery modules may undergo overcharge testing to determine boundaries and/or limits of the battery module and its individual battery cells. However, in certain instances, overcharging the battery module may lead to thermal runaway caused by overheating or over pressurization of the battery cells. Thermal runaway may render the battery module permanently inoperable, and therefore, devices that may prevent or block thermal runaway are desired. Additionally, individual battery cells of such battery systems may react differently upon charging, especially with age, and may be susceptible to thermal runaway under circumstances of an overcharge event in operation. Thermal runaway caused by overheating and/or over pressurization of a battery cell may create unstable conditions that may propagate to adjacent battery cells within a battery module. Overcharge protection mechanisms may protect the battery cell and the battery module from such overheating and/or over pressurization.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure relates to a battery module. The battery module includes a housing and a plurality of battery cells disposed in the housing. Each battery cell of the plurality of battery cells includes a casing housing electrochemically active components of the battery cell, and a cover assembly secured to the casing. The cover assembly includes a cover, a terminal protruding through the cover, a current collector electrically coupled to the terminal, and an overcharge protection assembly disposed between the terminal and the current collector. The overcharge protection assembly includes a spiral disk and a vent disk physically and electrically coupled to the spiral disk, wherein the vent disk is disposed between the spiral disk and the terminal and includes a concave structure forming a cavity between the vent disk and the terminal by the concave structure of the vent disk, wherein the vent disk is electrically coupled to the current collector via the spiral disk, wherein the vent disk is configured to deform into the cavity and break when a pressure within the casing exceeds a threshold value, and wherein the spiral disk is configured to apply a shearing force to the vent disk when the vent disk deforms into the cavity to facilitate the breakage of the vent disk and thereby interrupt electrical current flow between the current collector and the terminal.

The present disclosure also relates to a battery cell. The battery cell includes a casing housing electrochemically active components of the battery cell, and a cover assembly secured to the casing. The cover assembly includes a cover, a terminal protruding through the cover, a current collector electrically coupled to the terminal, an insulative gasket disposed between the terminal and the cover configured to prevent electrical current flow between the terminal and the cover, and an overcharge protection assembly disposed between the terminal and the current collector. The overcharge protection assembly includes a spiral disk and a vent disk physically and electrically coupled to the spiral disk, wherein the vent disk is disposed between the spiral disk and the terminal and includes a concave structure forming a cavity between the vent disk and the terminal by the concave structure of the vent disk, wherein the vent disk is electrically coupled to the current collector via the spiral disk, wherein the vent disk is configured to deform into the cavity and break when a pressure within the casing exceeds a threshold value, and wherein the spiral disk is configured to apply a shearing force to the vent disk when the vent disk deforms into the cavity to facilitate the breakage of the vent disk and thereby interrupt electrical current flow between the current collector and the terminal.

The present disclosure also relates to a lithium ion battery. The lithium ion battery includes a casing housing electrochemically active components of the lithium ion battery cell, and a cover assembly secured to the casing. The cover assembly includes a cover, a terminal protruding through the cover, a current collector electrically coupled to the terminal, an insulative gasket disposed between the terminal and the cover configured to prevent electrical current flow between the terminal and the cover, a terminal pad disposed outside of the cover and electrically coupled to the terminal, wherein the terminal extends through the terminal pad, and an overcharge protection assembly disposed between the terminal and the current collector configured to interrupt current between the terminal and the current collector. The overcharge protection assembly includes a spiral disk and a vent disk physically and electrically coupled to a center of the spiral disk, wherein the spiral disk and the vent disk include conductive materials, wherein the vent disk is disposed between the spiral disk and the terminal and comprises a concave structure forming a cavity between the vent disk and the terminal by the concave structure of the vent disk, wherein the vent disk is electrically coupled to the current collector via the spiral disk, wherein the vent disk includes a circular groove and is configured to deform into the cavity and break along the circular groove when a pressure within the casing exceeds a threshold value, and wherein the spiral disk includes one or more slits configured to rotate the spiral disk when the pressure within the casing exceeds the threshold value creating a shearing force, wherein the spiral disk is configured to apply the shearing force to the vent disk when the vent disk deforms into the cavity to facilitate the breakage of the vent disk along the circular groove and thereby interrupt electrical current flow between the current collector and the terminal.

DRAWINGS

Various aspects of this disclosure may be better understood upon reading the following detailed description and upon reference to the drawings in which.

DETAILED DESCRIPTION

Figure 1:
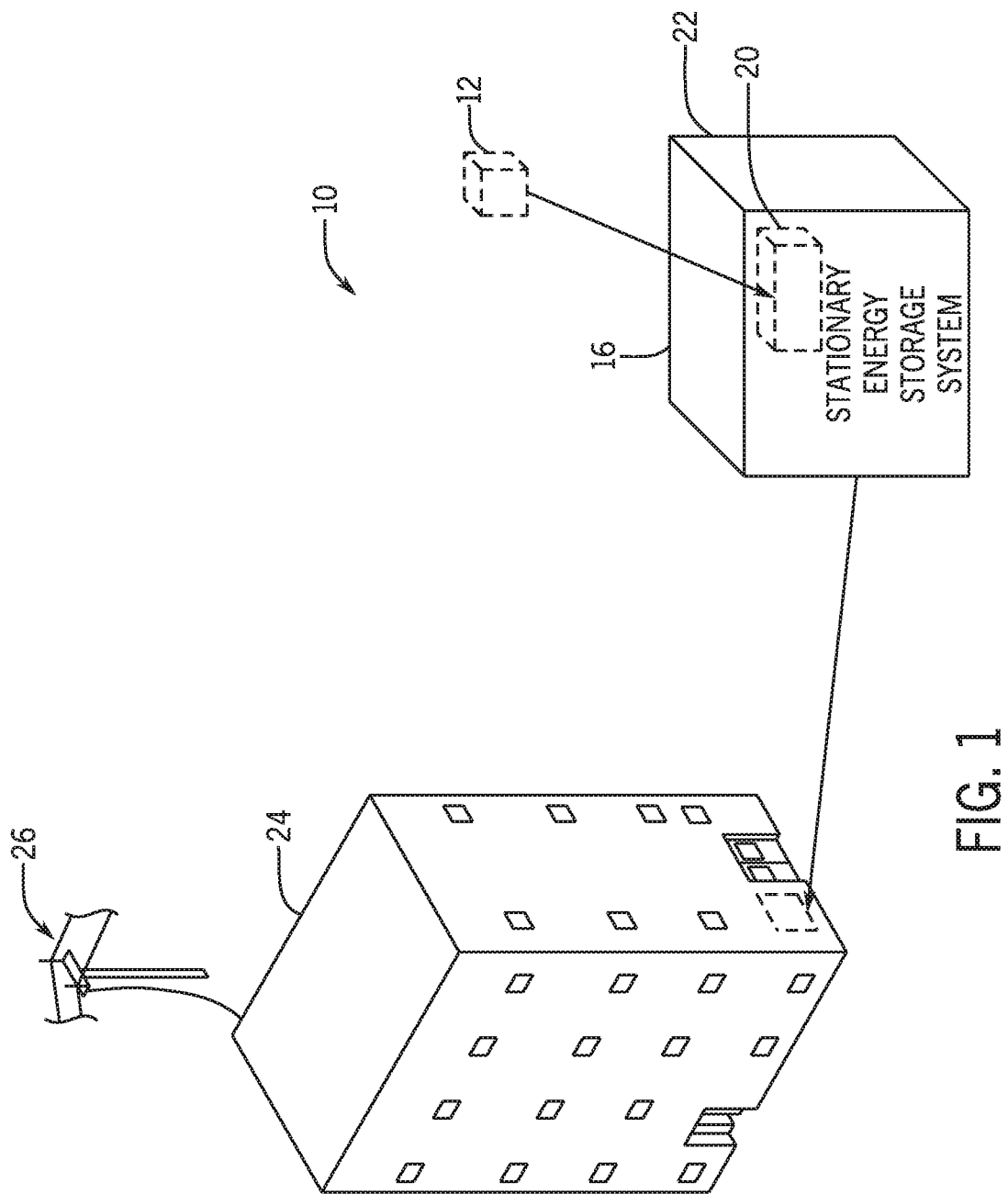
FIG. 1 is a schematic view of a lithium ion battery module configured to be used in a stationary energy storage system, in accordance with aspects of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The battery systems described herein may be used to provide power to various high voltage energy storage/expending applications (e.g., electrical grid power storage systems). Such battery systems may include one or more battery modules, each battery module having a number of battery cells (e.g., lithium-ion (Li-ion) electrochemical cells) arranged to provide particular voltages and/or currents. It should be noted that while the current discussion focuses on an overcharge protection assembly in a lithium-ion battery cell, embodiments of the overcharge protection assembly may be employed in any suitable battery cell that may be susceptible to an overcharge event. As an example, battery modules in accordance with present embodiments may be incorporated with or provide power to stationary power systems (e.g., non-automotive systems). In some embodiments, the battery systems described herein may be used to provide power to various types of electric vehicles, and the battery cells of the one or more battery modules may be arranged to provide particular voltages and/or currents useful to power, for example, one or more components of the electric vehicle.

Individual battery cells of such battery systems may react differently upon charging, especially with age. Thus, while such systems may include control features in an attempt to limit overcharging, the battery cells may be susceptible an overcharge event in certain circumstances. An overcharge event may cause the battery cell to overheat and/or over pressurize. Overheating and/or over pressurization may cause thermal runaway (e.g., when an increase in temperature changes conditions in such a way that causes a further increase in temperature) in the battery cell and/or battery module and may lead to propagation of unstable conditions to adjacent battery cells. Overcharge protection mechanisms may prevent voltage of the battery cell from rising above a particular voltage, thus protecting the battery cell and the battery module from such overheating and/or over pressurization.

It is now recognized that various features may be included in the battery cell that prevent or block thermal runaway in circumstances of an overcharge event. Generally, the disclosed embodiments are directed toward an overcharge protection assembly that may interrupt a current flow through the battery cell under circumstances of an overcharge event. The overcharge protection assembly may include a spiral disk and a vent disk that may be welded together. When the battery cell is experiencing overcharge, the internal pressure may increase. The increased pressure may deform the vent disk to pull and rotate the spiral disk. These forces (i.e. tensile force from internal pressure and shear force from rotation) may enable a 360° breakage of the vent disk along a vent groove. Complete breakage of the vent disk at the vent groove may enable an interruption of the current traveling through the battery cell and the overcharge protection assembly to a terminal of the battery cell.

Thus, the overcharge protection assembly may enable an interruption (e.g., stoppage) of the current when the battery cell is experiencing an overcharge. The current interruption may enable a decrease in the emergence of thermal runaway and unstable conditions in the battery cell in an overcharge event and propagation to adjacent battery cells.

FIG. 1 is a schematic view of an embodiment of a battery system 10 in which a battery module 12 (e.g., a lithium ion battery module) is configured to be used in a stationary energy storage system 16. More specifically, the battery module 12 may be used as all or a part of a stationary energy storage drawer 20. The stationary energy storage drawer 20 may be removably coupled to a housing 22 (e.g., cabinet) of the stationary energy storage system 16. Each stationary energy storage drawer 20 may include one or more battery modules 12, and the stationary energy storage system 16 may include one or more of the stationary energy storage drawers 20.

By way of example, the battery module 12 may have a plurality of lithium ion battery cells, such as between 10 and 20. The general configuration of the battery module 12 will be described in further detail below. Again, one or more of the battery modules 12 may be incorporated into the stationary energy storage drawer 20, several of which may connect with the larger stationary energy storage system 16 to provide a desired energy storage, energy conditioning, and/or energy output capability for a facility 24.

As shown, the facility 24 may include a building or similar setting normally connected to an electrical power grid 26 or other main source of energy to provide power for everyday power consumption. However, in other embodiments the facility 24 may be a facility that is not connected to the electrical power grid 26 and therefore completely relies on other means to provide electrical energy (e.g., the stationary storage system 16). Further, the facility 24 may be a home or other setting. The stationary energy storage system 16 may be incorporated into or otherwise connected to an electrical grid of the facility 24 to provide power as needed. As non-limiting examples, the stationary energy storage system 16 may provide power to the facility 24 as a backup to the electrical power grid 26 (e.g., due to power outage), for power conditioning, for supplementing power or offsetting power consumption from the electrical power grid 26, and so forth.

Figure 2:
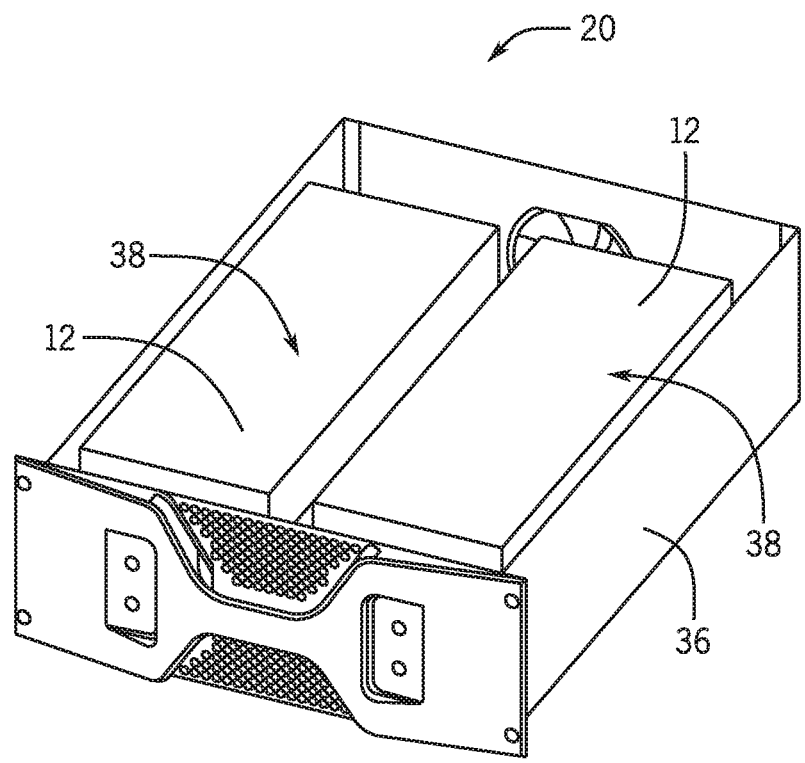
FIG. 2 is a perspective view of an embodiment of a stationary energy storage drawer having two battery modules positioned side-by-side within a stationary drawer housing, in accordance with aspects of the present disclosure.

FIG. 2 illustrates and embodiment of the stationary energy storage drawer 20 having two battery modules 12 positioned side-by-side within a housing 36 of the stationary energy storage drawer 20. As previously discussed, one or more stationary energy storage drawers 20 may be removably coupled to the housing 22 (e.g., cabinet) of the stationary energy storage system 16. Each stationary energy storage drawer 20 may include one or more of the battery modules 12 that may be positioned side-by side within the stationary drawer housing 36. Each of the battery modules 12 may include a number of battery cells (e.g., lithium ion battery cells). The battery cells may be partially or substantially enclosed within a battery module housing 38. The battery module housing 38 may be a molded plastic housing that may have a complementary shape to the enclosed battery cells, or may be any appropriate form. Thermal runaway or other detrimental effect caused by an overcharge event in a battery cell may effect one or more battery cells of the battery module 12 and/or other battery modules of the stationary energy storage drawer 20. However, as set forth above, the battery cells may include the current interrupt features of the present disclosure.

Figure 3:
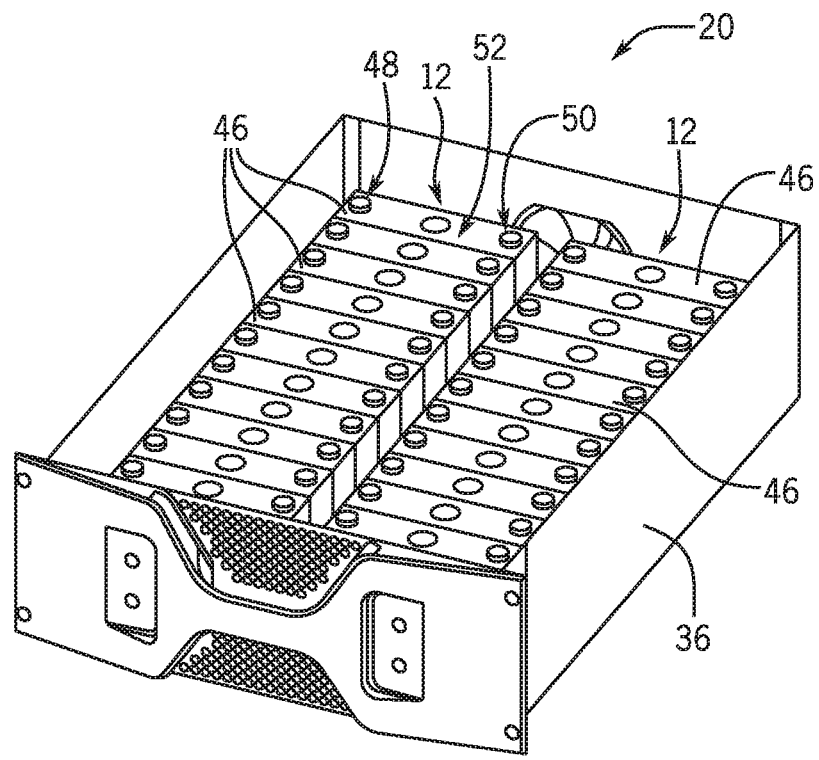
FIG. 3 is a perspective view of an embodiment of a stationary energy storage drawer having two battery modules of individual battery cells positioned side-by-side within a stationary drawer housing, in accordance with aspects of the present disclosure.

FIG. 3 illustrates the stationary energy storage drawer 20 having two battery modules 12 (illustrated without a part of the battery module housing 38), each having several battery cells 46 oriented parallel to one another within the battery module 12. In the illustrated embodiment, the battery cells 46 are positioned in rows within the battery modules 12. While illustrated as including eleven battery cells, other numbers and configurations of the battery cells 46 may be provided. However, the battery cells 46 will generally be provided in an amount and configuration so as to have a sufficient energy density, voltage, current, capacity, and so forth, for a particular application. Further, while the battery cells 46 are shown as having a polygonal or rectangular shape, in other embodiments, the battery cells 46 may be prismatic, cylindrical, or another shape, or a combination thereof.

Each of the battery cells 46 may include a plurality of terminals (e.g., two terminals). For example, the battery cells 46 may each include a positive terminal 48 and a negative terminal 50 at a first end (a terminal end) of the battery cell 46. The terminals 48, 50 are electrically connected to electrochemically active materials contained within a body 52 of the battery cell 46. The battery cells 46 may be electrically connected in various parallel and/or serial arrangements within the battery module 12. The close proximity of the battery cells 46 to one another may cause propagation of thermal runaway caused by overheating and/or over pressurization of one of the battery cells 46 during an overcharge event. An overcharge protection assembly of each of the battery cells 46 may enable protection of the battery cell against thermal runaway due to an overcharge event and may enable protection of adjacent battery cells 46 and battery modules 12 in such circumstances, as discussed in greater detail below.

Figure 4:
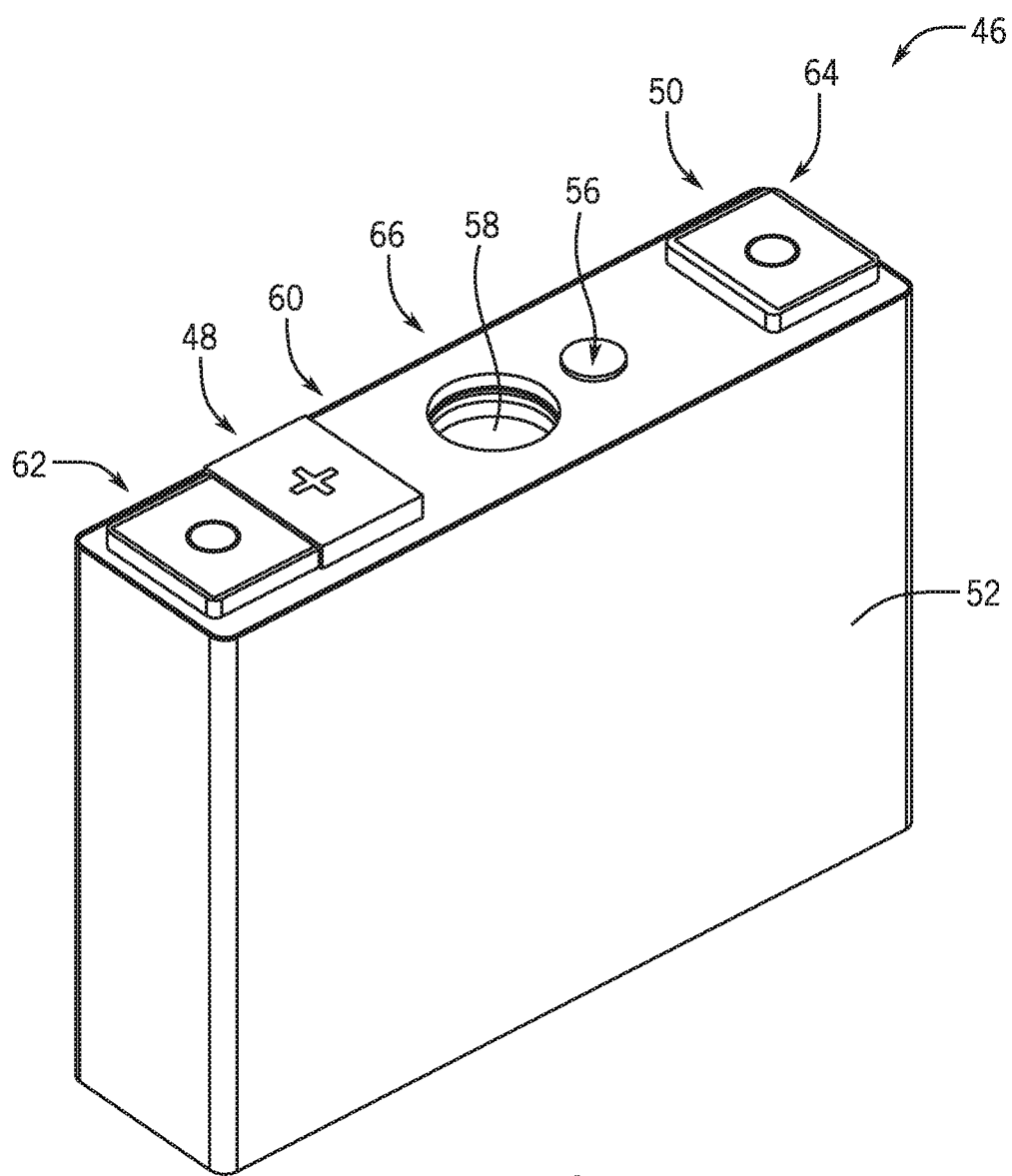
FIG. 4 is a perspective view of an embodiment of a battery cell, in accordance with aspects of the present disclosure.

FIG. 4 is a perspective view of an embodiment of one of the battery cells 46. The battery cell 46 may include a fill hole that may be sealed with a patch 56 (e.g. Al patch). The illustrated battery cell 46 may include the terminals 48, 50 (e.g., positive terminal and negative terminal, respectively) that may be used to make electrical connections to the battery cell 46. The terminals 48, 50 are electrically connected to electrochemically active materials contained within the body 52 of the battery cell 46. Charging of the battery cell 46 may cause the electrochemically active materials within the body 52 of the battery cell 46 undergo electrochemical reactions, which generates heat and gas. In some embodiments, the battery cell 46 may include a vent 58 that may be used to vent effluent from within the battery cell 46 caused by reactions of the electrochemically active materials. In circumstances of an overcharge event, thermal runaway may take place, which may further heat the electrochemically active materials and cause an over pressurization of the battery cell 46. To protect the battery cell 46 from thermal runaway caused by such an overcharge event, the battery cell 46 may include an overcharge protection assembly 60 positioned under a first terminal pad 62 or a second terminal pad 64 of the battery cell 46.

The terminal pads 62, 64 that may be directly coupled to the terminals 48, 50. Specifically, the first terminal pad 62 may be coupled to the positive terminal 48 and the second terminal pad 64 may be coupled to the negative terminal 50. The terminals 48, 50 and the respective terminal pads 62, 64 may be disposed at opposite ends of a terminal surface 66 of the battery cell. In some embodiments, the terminal pads 62, 64 may be coupled to the terminals 48, 50 via a weld (e.g., laser weld) such that the terminal pads 62, 64 are secured to the terminals 48, 50 and form an electrical connection between the terminal pads 62, 64 and the terminals 48, 50. In some embodiments, the terminal pads 62, 64 may be coupled to the terminals 48, 50 via fasteners (e.g., rivets, screws, or bolts), or any other suitable technique for securing and electrically coupling two components to one another.

The overcharge protection assembly 60 may be positioned below one of the terminal pads and the corresponding terminal. For example, in some embodiments, the overcharge protection assembly 60 may be positioned below the first terminal pad 62 and the positive terminal 48. In some embodiments, the overcharge protection assembly 60 may be positioned below the second terminal pad 64 and the negative terminal 50. The overcharge protection assembly 60 may create an interrupt in the electrical current traveling to the corresponding terminal if overheating and/or over pressurization of the battery cell 46 occurs, such as may occur in an overcharge event, as discussed in greater detail with respect to FIGS. 8 and 9.

Figure 5:
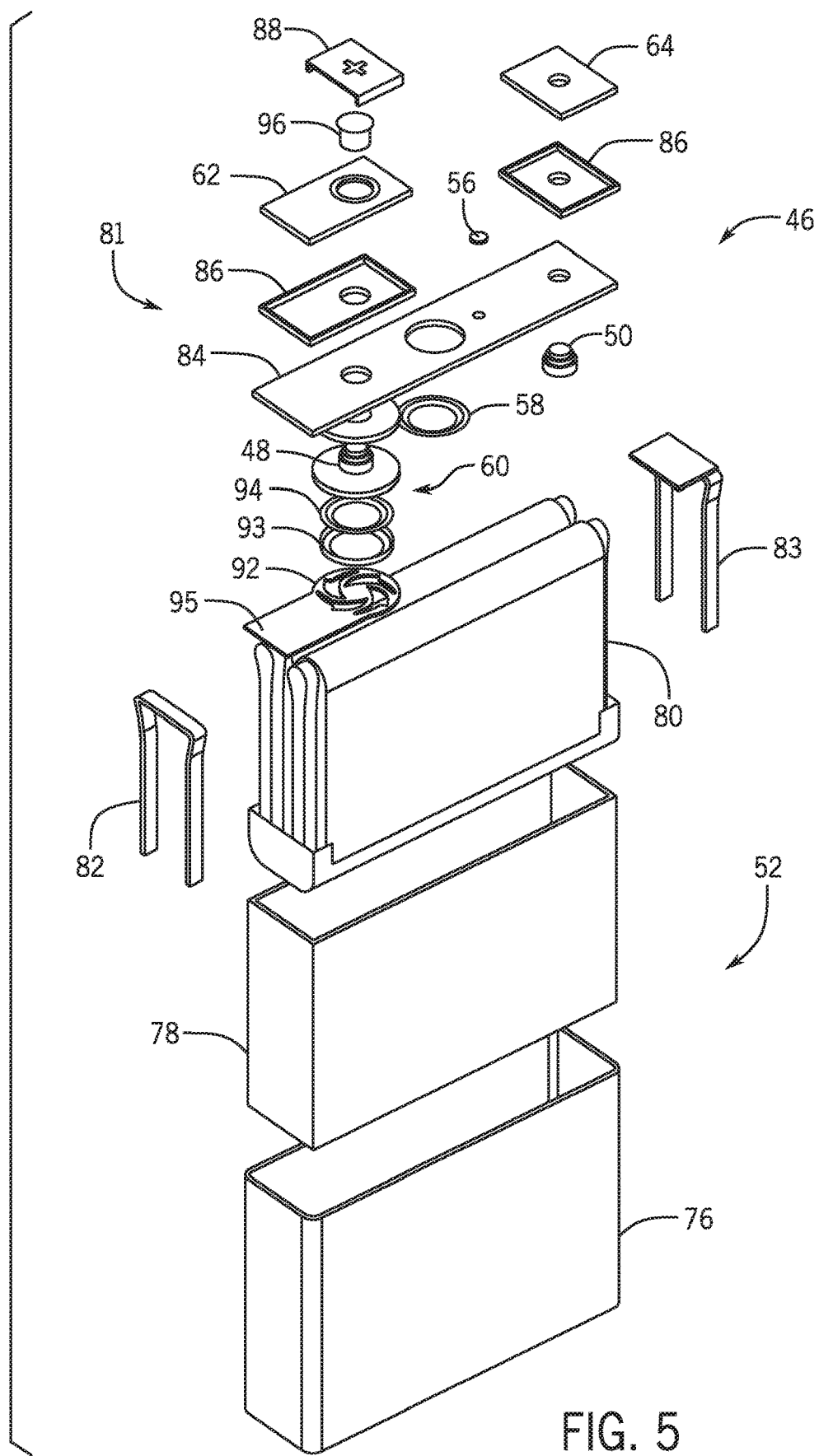
FIG. 5 is an exploded view of an embodiment of the battery cell of FIG. 4 having an overcharge protection assembly, in accordance with aspects of the present disclosure.

FIG. 5 is an exploded view of an embodiment of the battery cell 46 having the overcharge protection assembly 60. The body 52 of the battery cell 46 may include a casing 76 (e.g., can) and an insulation pouch 78. Within the casing 76 and the insulation pouch 78, the body 52 of the battery cell 46 may include one or more coil stacks 80. The electrochemically active materials of the battery cell 46 may be disposed within the coil stacks 80. The battery cell 46 may include a cover assembly 81 secured to the casing 76 including a cover 84, the terminals 48, 50, current collectors 82, 83 associated with the terminals 48, 50 and the overcharge protection assembly 60. The battery cell 46 may include a positive current collector 82 disposed below the positive terminal 48 and a negative current collector 83 disposed below the negative terminal 50. The current collectors 82, 83 may be electrically coupled to the coil stacks 80. The battery cell 46 may include a cover 84 that may enclose the coil stack 80 and the current collectors 82, 83 within the casing 76. The terminals 48, 50 may extend through the cover 84. The battery cell 46 may include a terminal insulator 86 that may be positioned above the cover 84. The terminals 48, 50 may extend through the terminal insulator 86. The terminal pads 62, 64 may be positioned axially above the terminal insulator 86 and may be coupled to the terminals 48, 50, as previously discussed. The terminals 48, 50 may extend through the terminal pads 62, 64 such that the terminal pads 62, 64 surround the respective terminals 48, 50 creating a flat interface for the terminals 48, 50. The battery cells 46 may include one or more terminal covers 88 that may cover the terminals 48, 50. In some embodiments, the battery cell 46 may include the vent 58 that may be used to vent effluent from within the battery cell 46 caused by reactions of the electrochemically active materials. The vent 58 may open when the pressure within the battery cell exceeds a particular pressure threshold.

In the illustrated embodiment, the battery cell 46 includes the overcharge protection assembly 60. The overcharge protection assembly 60 may be disposed proximate to (e.g., below) one of the terminals 48, 50. The overcharge protection assembly 60 may include a spiral disk 92 and a vent disk 94. In some embodiments, a lower insulator 93 (e.g., second insulative component) may separate the spiral disk 92 and the vent disk 94. In some embodiments, the spiral disk 92 may be coupled to the vent disk 94 via a weld (e.g., laser weld, ultrasonic weld, resistance weld) to form an electrical connection between the spiral disk 92 and the vent disk 94. In other embodiments, the spiral disk 92 may be coupled to the vent disk 94 via fasteners (e.g., rivets, screws, or bolts), or any other suitable technique for securing and electrically coupling two components to one another.

As illustrated, the spiral disk 92 and the vent disk 94 may be disposed between the cover 84 and the current collector 82. The spiral disk 92 may be welded, or otherwise coupled, to the current collector 82 via an extension portion 95 of the spiral disk 92 to form an electrical connection between the spiral disk 92 and the current collector 82. Over pressurization of the battery cell 46 may cause the vent disk 94 of the overcharge protection assembly 60 to deform and pull the spiral disk 92 axially upward, enabling the spiral disk to rotate. These forces may cause the vent disk 94 of the overcharge protection assembly 60 to shear, as discussed in detail below, thus breaking the electrical connection between the current collector 83 and the terminal 50. This breakage may interrupt the current and prevent the current from traveling upward toward the respective terminal below which the overcharge protection assembly 60 is disposed. In some embodiments, the overcharge protection assembly 60 may be sealed by plastic cover 88 and triggered at a lower pressure than the vent 58. In some embodiments, a plug 96 may be used to seal the overcharge protection assembly 60 too. Therefore, the overcharge protection assembly 60 may interrupt current to the terminal at a state of charge lower that would be required to open the vent 58. In this manner, the overcharge protection assembly 60 may protect the battery cell 46 from thermal runaway under circumstances of an overcharge event, and may protect adjacent battery cells 46 and/or battery modules 12 from propagation of thermal runaway.

Figure 6:
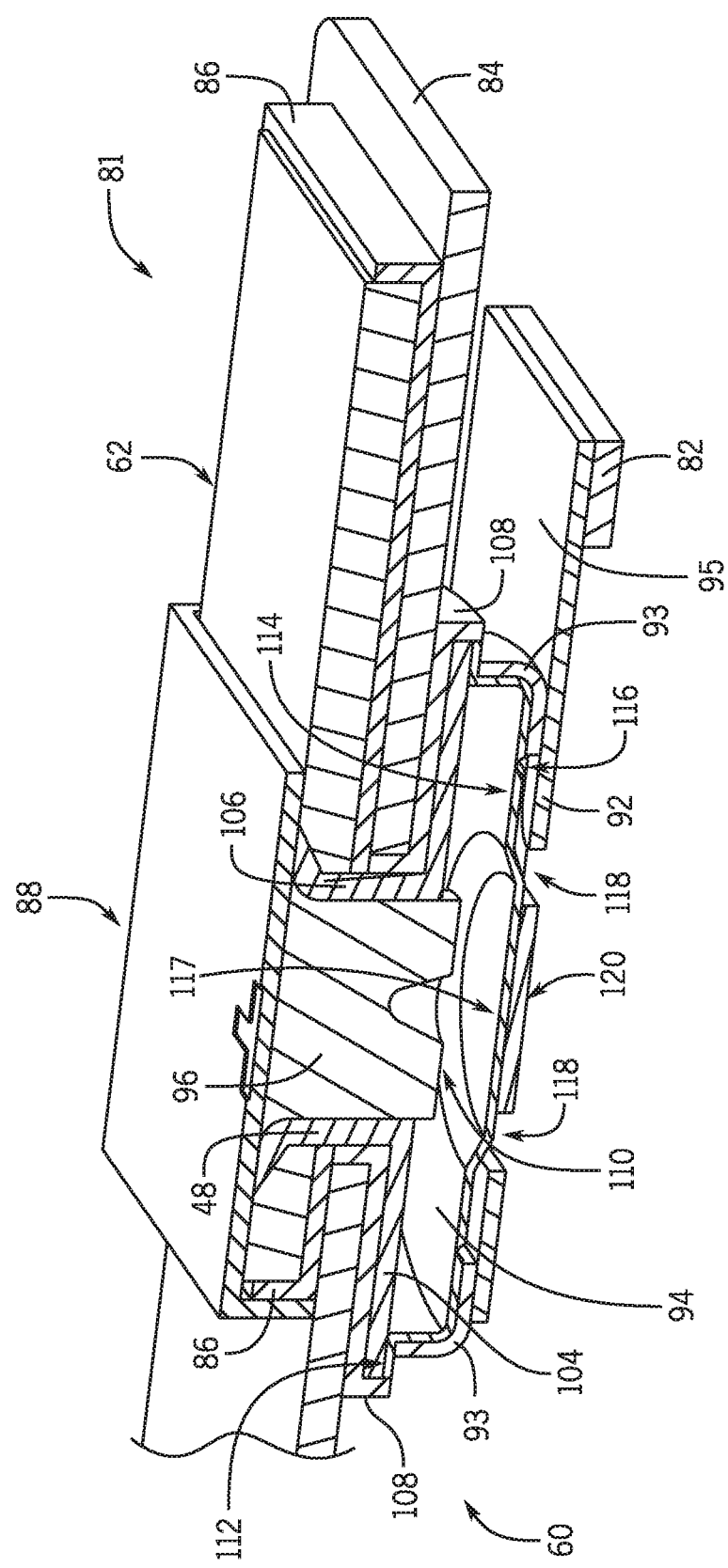
FIG. 6 is a cross-section view of an embodiment of an overcharge protection assembly of the battery cell of FIG. 4, in accordance with aspects of the present disclosure.

FIG. 6 is an expanded cross section view of a portion of the cover assembly 81 of the battery cell 46 including an embodiment of the overcharge protection assembly 60. In the illustrated embodiment, the overcharge protection assembly 60 is disposed below the positive terminal 48. However, in other embodiments, the overcharge protection assembly 60 may be disposed below the negative terminal 50, or at any at any other position suitable for interrupting the electrical current traveling through the battery cell 46 in an overcharge event.

As previously discussed, the terminal 48 may be surrounded by the terminal pad 62 such that the terminal 48 extends to or through the terminal pad 62. Similarly, the terminal 48 may extend through the cover 84. In the illustrated embodiment, the terminal insulator 86 (e.g., first insulative component) is positioned between the cover 84 and the terminal pad 62 such that the terminal 48 also extends through the terminal insulator 86. The terminals 48, 50 may include a lower planar portion 104 (i.e., lower in relation to a base of the battery cell 46) and an upper post portion 106 (i.e., upper in relation to the base of the battery ell 46). The cover 84, the terminal insulator 86, and the terminal pad 62 may be disposed above the lower planar portion 104 of the terminal 48 relative to the base of the battery cell 46, and the upper post portion 106 of the terminal may extend through the cover 84, the terminal insulator 86, and the terminal pad 62. The top of the upper post portion 106 of the terminal 48, relative to the base of the battery cell, may be covered by the terminal cover 88. In some embodiments, an insulative gasket 108 may be disposed between the terminal 48 and the cover 84 to act as a seal. The insulative gasket 108 may prevent electrical current from flowing between the terminal 48 and the cover 84.

The overcharge protection assembly 60 may be positioned below the lower planar portion 104 of the terminal 48 between the terminal 48 and the current collector 82. In some embodiments, a plug 96 may be used to seal the overcharge protection assembly 60. The overcharge protection assembly 60 may include the spiral disk 92, the vent disk 94, and a cavity 110 formed by the vent disk 94. The vent disk 94 may be positioned directly below the lower planar portion 104 of the terminal 48 such that the vent disk 94 is in physical and electrical contact with the lower planar portion 104. The vent disk 94 may have a circular concave structure such that only an edge 112 of the vent disk 94 may be in contact with the terminal 48. A concave portion 114 of the vent disk 94 may be spaced a distance away from the terminal 48 and may form the cavity 110 directly below the terminal 48. The cavity 110 may enable movement and breakage of the vent disk 94 in an overcharge event. In some embodiments, the vent disk 94 may have a groove 116 (e.g., a circular groove) on the concave portion 114. The groove 116 may be a scored or thinner area of the vent disk 94. The groove 116 may be the site of breakage or shearing in an overcharge event, and thus the site of current interrupt. A center 117 of the concave portion 114 of the vent disk 94 may be disposed on top of and in contact with the spiral disk 92.

The spiral disk 92 may be positioned below the vent disk 94. The spiral disk 92 may be a circular disk with one or more slits 118 carved out. The one or more slits 118 may enable gas to pass through and create rotation of the spiral disk 92 upon over pressurization within the battery cell 46. A center 120 of the spiral disk 92 may contact the center 117 of the concave portion 114 of the vent disk 94. At this point of contact, in some embodiments, the center 120 spiral disk 92 may be coupled to the center 117 of the concave portion 114 of the vent disk 94 via a weld such that the center 120 of spiral disk 92 is secured to the vent disk 94 and forms an electrical connection between the spiral disk 92 and the vent disk 94. In some embodiments, the center 120 of the spiral disk 92 may be coupled to the concave portion 114 of the vent disk 94 via fasteners (e.g., rivets, screws, or bolts), or any other suitable technique for securing and electrically coupling two components to one another. In some embodiments, this welding may be the only point of connection between the spiral disk 92 and the vent disk 94.

In the illustrated embodiment, the lower insulator 93 (e.g., second insulative component) separates the spiral disk 92 and the vent disk 94 along the edges of each component. The spiral disk 92 may be electrically coupled to the current collector 82 via the extension portion 95 of the spiral disk 92. Over pressurization within the battery cell 46 may push the vent disk 94 upward and rotate the spiral disk 92 via the one or more slits 118. The upward force and the shearing (e.g., rotational) force of the spiral disk 92 on the vent disk 94 may shear the vent disk 94 along the vent groove 116, thus interrupting the travel path of the electrical current to the terminal 48, as discussed in greater detail with reference to FIGS. 8 and 9.

Figure 7:
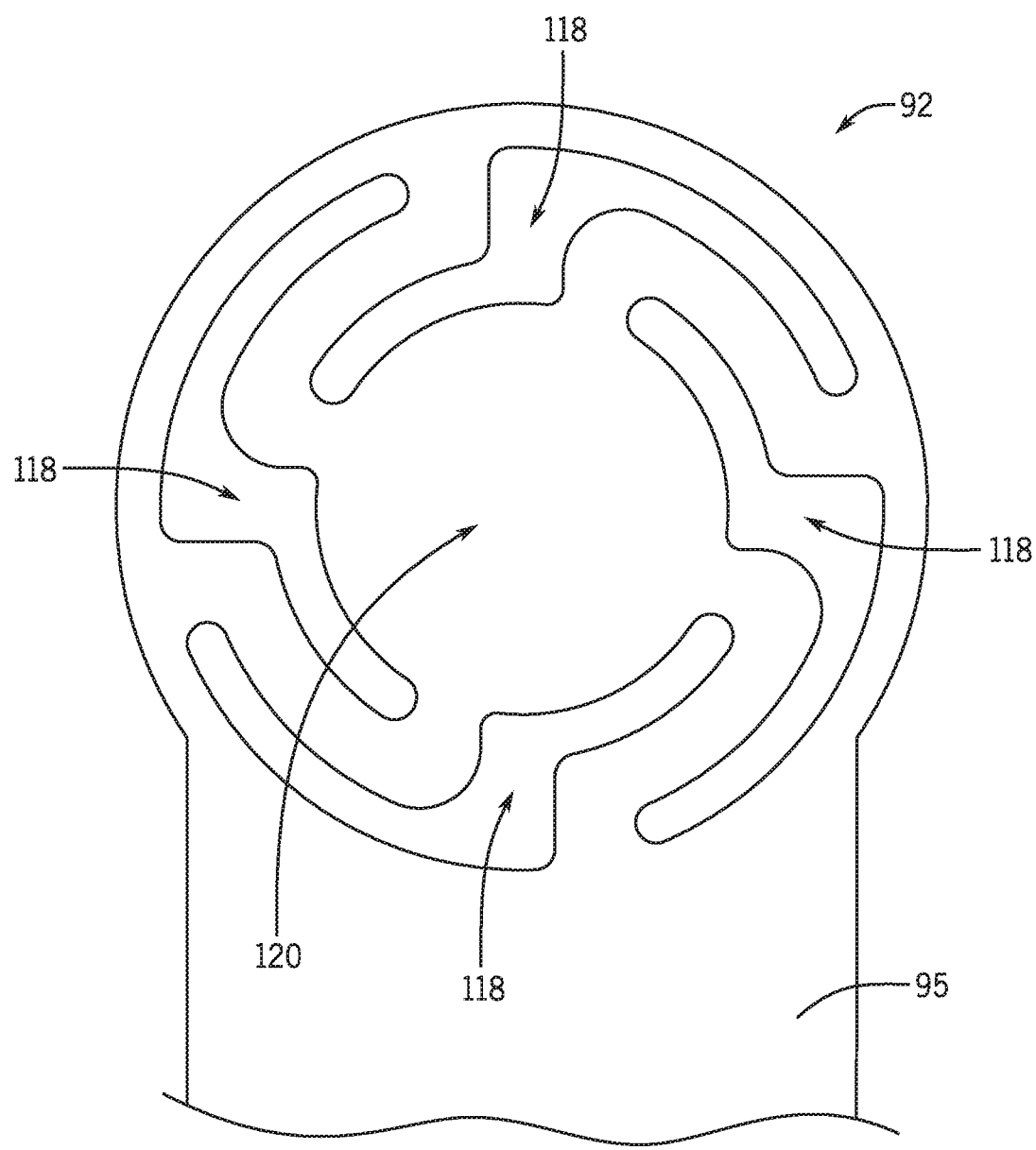
FIG. 7 is a top view of an embodiment of a spiral disk of the overcharge protection assembly of FIG. 6, in accordance with aspects of the present disclosure.

FIG. 7 illustrates a top view of an embodiment of the spiral disk 92 of the overcharge protection assembly 60 of FIG. 6. As previously discussed, the spiral disk 92 may be a circular disk with the one or more slits 118 carved out. The one or more slits 118 may enable gas to pass through and create rotation of the spiral disk 92 upon over pressurization within the battery cell 46. The center 120 of the spiral disk 92 may contact the center 117 of the concave portion 114 of the vent disk 94. At this point of contact, in some embodiments, the center 120 spiral disk 92 may be coupled to the center 117 of the concave portion 114 of the vent disk 94 via a weld such that the center 120 of spiral disk 92 is secured to the vent disk 94 and forms an electrical connection between the spiral disk 92 and the vent disk 94. In some embodiments, the center 120 of the spiral disk 92 may be coupled to the concave portion 114 of the vent disk 94 via fasteners (e.g., rivets, screws, or bolts), or any other suitable technique for securing and electrically coupling two components to one another. In some embodiments, this welding may be the only point of connection between the spiral disk 92 and the vent disk 94. The spiral disk 92 may be welded, or otherwise coupled, to the current collector 82 via the extension portion 95 of the spiral disk 92 to form an electrical connection between the spiral disk 92 and the current collector 82.

Figure 8:
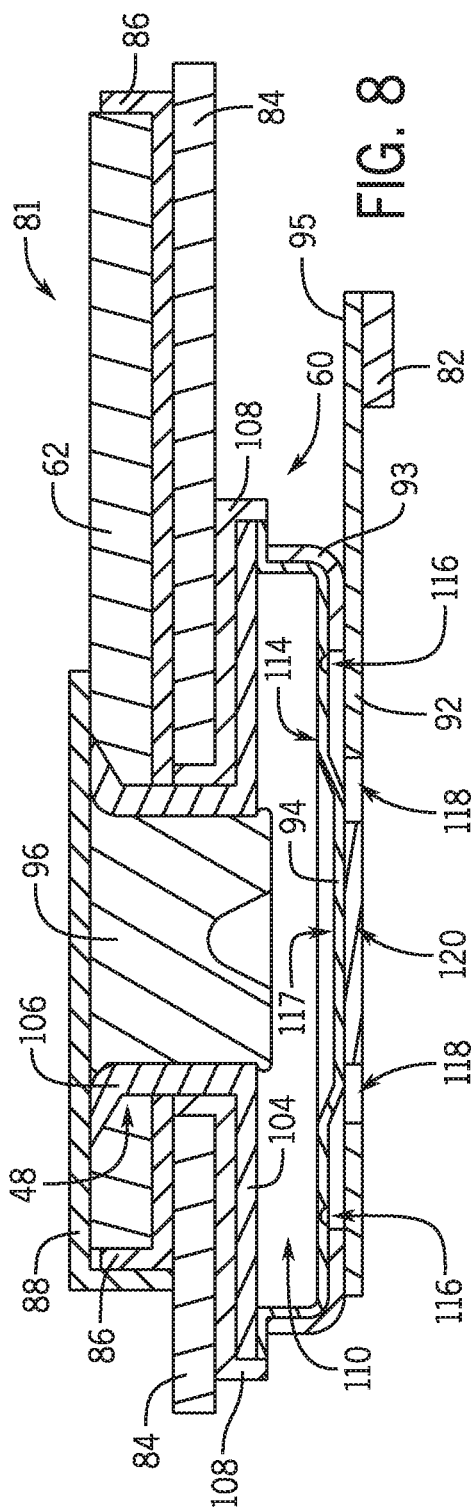
FIG. 8 is a cross-section view of an embodiment of the overcharge protection assembly of FIG. 6 in a closed position, in accordance with aspects of the present disclosure.

FIG. 8 illustrates a cross-section view of an embodiment of the terminal 48 of the cover assembly 81 of FIG. 6 and the associated overcharge protection assembly 60. As previously discussed, the upper post portion 106 of the terminal 48 may extend through the insulative gasket 108, the cover 84, the terminal insulator 86, and the terminal pad 62. The overcharge protection assembly 60, including the spiral disk 92, the vent disk 94, and the cavity 110, may be positioned below the terminal 48 and may interrupt electrical current traveling to or from the terminal and/or the terminal pad if overheating and/or over pressurization occurs within the battery cell 46. As previously discussed, the spiral disk 92 may be in contact with the current collector 82 at the extension portion 95 of the spiral disk 92, the vent disk 94 may be in contact with the center 120 of the spiral disk 92, and the vent disk 94 may be in contact with the terminal 48 at the edge 112 of the vent disk 94.

In some embodiments, the current collector 82, the spiral disk 92, and the vent disk 94 may be electrically coupled and may each be made of conductive material such that the current may travel along each of them to and/or from the terminal 48. For example, the current collector 82 may be electrically coupled to a cathode portion of the coil stacks 80. In the illustrated embodiment, the current may flow from the current collector 82 to the spiral disk 92 at the point of electrical connection between them at the extension portion 95 of the spiral disk. The current may flow through the spiral disk 92 to the center 120 of the spiral disk 92. The current may flow from the center 120 of the spiral disk 92 to the vent disk 94 at the point where they are welded and electrically coupled together at the center 117 of the concave portion 114. The current may flow through the concave portion 114 up to the edge 112 of the vent disk 94 where it may be electrically coupled to the lower planar portion 104 of the terminal 48. The current may flow from the lower planar portion 104 of the terminal 48 to the upper post portion 106 of the terminal 48 and to the terminal pad 62.

In some cases, the chemical reactions and material decompositions of the electrochemically active material and electrolyte may cause cell internal pressure to increase within the casing 76. In some embodiments, some electrolyte additives may be used to facilitate the gassing during overcharge. As the battery cell 46 is overcharged, the temperature within the casing 76 may increase (e.g., from an excess of electric current), and the pressure may increase in the casing 76. When the pressure within the casing 76 reaches a threshold value (e.g., a predetermined pressure value lower than a pressure known to indicate thermal runaway), the overcharge protection assembly 60 may be triggered.

In the illustrated embodiment, the vent disk 94 of the overcharge protection assembly is intact and not broken along the groove 116. This may be an indication that the pressure within the casing 76 of the battery cell 46 has not reached the threshold value (e.g., a predetermined pressure value lower than a pressure known to indicate thermal runaway) that may trigger the overcharge protection assembly 60. If the battery cell 46 is overcharged and the pressure within the casing 76 of the battery cell 46 reaches the threshold value, the pressure and a shearing force created by the spiral disk 92 may break the vent disk 94 along the groove 116. This may interrupt the current flow, which in turn, may slow or stop the chemical reactions of the electrochemically active materials. Thus, the pressure and/or temperature within the casing 76 of the battery cell 46 may not increase to a point that may cause thermal runaway to occur. In some embodiments, the threshold value that may trigger the overcharge protection assembly 60 may be a lower pressure than a pressure that causes the vent 58 to open. A lower triggering threshold value of the overcharge protection assembly 60 may decrease the likelihood of thermal runaway in an overcharge event and before effluent is released from the battery cell 46, which could otherwise render the entire battery module 12 inoperable.

Figure 9:
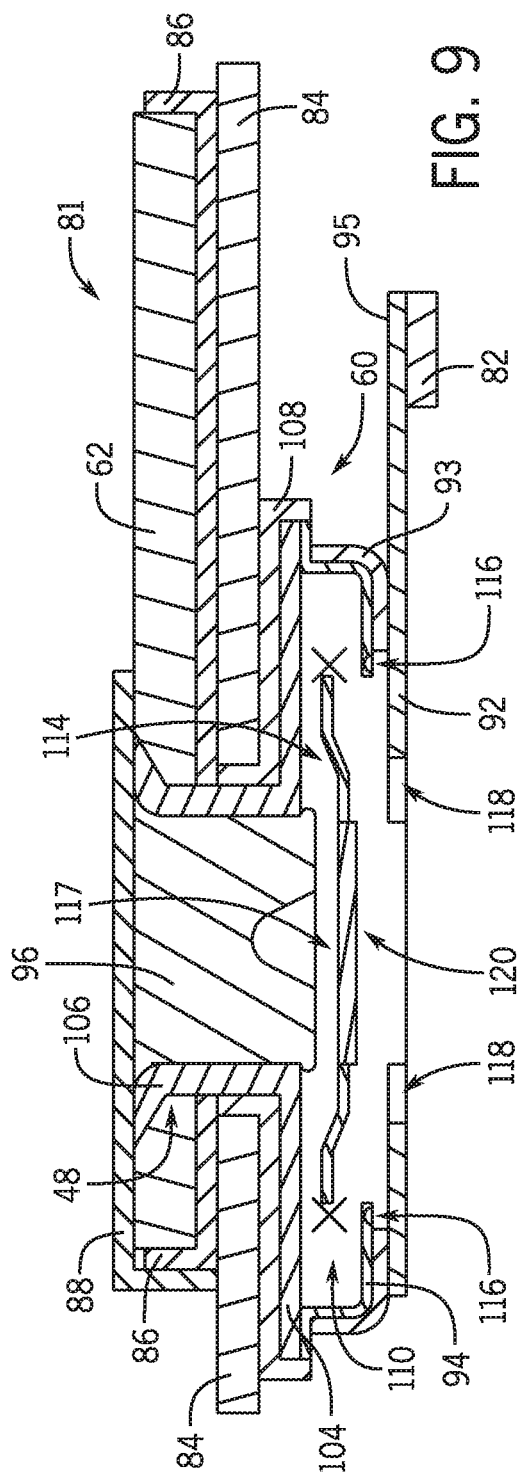
FIG. 9 is a cross-section view of an embodiment of the overcharge protection assembly of FIG. 8 in an open position, in accordance with aspects of the present disclosure.

FIG. 9 illustrates a cross-section view of an embodiment of the terminal 48 of the cover assembly 81 of FIG. 8 and the associated overcharge protection assembly 60 after the overcharge protection assembly 60 has been triggered by a pressure within the casing 76 greater than the threshold pressure. When the pressure within the casing 76 reaches the threshold value (e.g., a predetermined pressure value lower than a pressure known to indicate thermal runaway) as the battery cell 46 is overcharged, the overcharge protection assembly 60 may be triggered.

When the pressure within the casing 76 reaches the threshold value that triggers the overcharge protection assembly 60 to interrupt the current to the terminal 48, the increased pressure within the battery cell 46 may push the vent disk 94 upward via the slits 118 of the spiral disk 92, and may rotate the spiral disk 92. The pressure that may cause the vent disk 94 to push upward may be caused by reaction and decomposition of the electrochemically active materials, electrolyte, additives, and/or gas that may be produced as a byproduct of the chemical reactions. As the vent disk 94 pushes up at the center 117 of the concave portion 114, the pressure from within the battery cell 46 may cause the spiral disk 92 to twist or rotate via the one or more slits 118 in the spiral disk 92. The rotation of the spiral disk 92 may create the shearing force exerted on the center 117 of the concave portion 114 of the vent disk 94 by the spiral disk 92. The pressure and the shear force exerted on the center 117 of the concave portion 114 of the vent disk 94 by the spiral disk 92 may cause the concave portion 114 (e.g., a substantial portion of the concave portion 114) of the vent disk 94 to shear or break away at the groove 116 where the vent disk 94 is scored or thinner.

Once the concave portion 114 of the vent disk 94 has been sheared along the groove 116, the center 120 of the spiral disk 92 may hold the concave portion 114 of the vent disk 94 within the cavity 110 formed between the vent disk 94 and the terminal 48. Breakage of the vent disk 94 along the groove 116 may interrupt the electrical connection between the vent disk 94 and the terminal 48, and thus the current flow between the terminal 48 and the current collector 82. The chemical reactions of the electrochemically active material that may increase the pressure and temperature within the battery cell 46 may only continue as long as the current is able to flow from the current collector 82 to the terminal 48 and/or terminal pad 62. Thus, interruption of the current flow via breakage of the vent disk 94 at an increased pressure lower than a pressure known to indicate thermal runaway (e.g., the threshold pressure) may protect the battery cell 46 from thermal runaway in circumstances of an overcharge event. Further, the overcharge protection assembly 60 may protect adjacent battery cells 46 and/or battery modules 12 by interrupting the current flow and overcharging of the battery cell 46 before unstable conditions emerge.

One or more of the disclosed embodiments, alone or in combination, may provide one or more technical effects useful in the manufacture of battery modules, and portions of battery modules. The disclosed embodiments relate to battery cells that include an overcharge protection assembly. The overcharge protection assembly may interrupt current flow to the corresponding terminal of the battery cell when a pressure in a casing of the battery cell reaches a threshold value. The overcharge protection assembly may include a spiral disk, a vent disk, and a cavity formed by the concave structure of the vent disk. The spiral disk may be electrically coupled to the current collector of the battery cell. The spiral disk may further be welded to the vent disk positioned above the spiral disk. The edges of the vent disk may interface with the corresponding terminal, thus forming the cavity above the vent disk and below the terminal. In an overcharge event that may cause overheating and/or over pressurization of the battery cell, pressure from the battery cell may push the vent disk upward and cause the spiral disk to rotate via slits in the spiral disk. The pressure and the twisting or shearing force may be exerted on the vent disk coupled to the spiral disk and may cause the vent disk to shear or break along a groove in the vent disk. This breakage may interrupt or stop the current flow from the current collector to the corresponding terminal, thus stopping the battery cell from charging further. Thus, the overcharge protection assembly may protect the battery cell from thermal runaway that may be caused by overcharging, and may protect adjacent battery cells or battery modules from propagation of thermal runaway and such unstable conditions. It should be noted that the embodiments described in the specification may have other technical effects and can solve other technical problems.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The invention claimed is:

1. A prismatic battery cell, comprising:
a casing housing electrochemically active components of the prismatic battery cell, and a cover assembly secured to the casing and comprising a cover, a terminal protruding through the cover, a current collector electrically coupled to the terminal, an insulative gasket disposed between the terminal and the cover configured to prevent electrical current flow between the terminal and the cover, and an overcharge protection assembly disposed between the terminal and the current collector;
wherein the overcharge protection assembly comprises a spiral disk and a vent disk physically and electrically coupled to the spiral disk, wherein the vent disk is disposed between the spiral disk and the terminal and comprises a concave structure forming a cavity between the vent disk and the terminal by the concave structure of the vent disk, wherein the vent disk is electrically coupled to the current collector via the spiral disk, wherein the vent disk is configured to deform into the cavity and break when a pressure within the casing exceeds a threshold value, and wherein the spiral disk is configured to apply a shearing force to the vent disk when the vent disk deforms into the cavity to facilitate the breakage of the vent disk and thereby interrupt electrical current flow between the current collector and the terminal.

2. The battery module of claim 1, wherein a center of the spiral disk is coupled to the vent disk.

3. The battery module of claim 1, wherein the vent disk comprises a groove, wherein the vent disk is configured to break along the groove when the pressure within the casing exceeds the threshold value, and wherein the threshold value is indicative of a pressure lower than a pressure associated with thermal runaway.

4. The battery module of claim 1, wherein the spiral disk is configured to maintain contact with a portion of the vent disk and to hold the portion of the vent disk within the cavity after the vent disk breaks.

5. The battery module of claim 1, wherein the spiral disk comprises one or more slits configured to rotate the spiral disk when the pressure within the casing exceeds the threshold value creating the shearing force.

6. The battery module of claim 1, wherein the cover assembly comprises a terminal pad disposed outside of the cover and electrically coupled to the terminal, wherein the terminal extends through the terminal pad.

7. A battery module, comprising:
a housing; and
a plurality of prismatic battery cells disposed in the housing, wherein each prismatic battery cell of the plurality of prismatic battery cells comprises a casing housing electrochemically active components of the prismatic battery cell, and a cover assembly secured to the casing and comprising a cover, a terminal protruding through the cover, a current collector electrically coupled to the terminal, and an overcharge protection assembly disposed between the terminal and the current collector;
wherein the overcharge protection assembly comprises a spiral disk and a vent disk physically and electrically coupled to the spiral disk, wherein the vent disk is disposed between the spiral disk and the terminal and comprises a concave structure forming a cavity between the vent disk and the terminal by the concave structure of the vent disk, wherein the vent disk is electrically coupled to the current collector via the spiral disk, wherein the vent disk is configured to deform into the cavity and break when a pressure within the casing exceeds a threshold value, and wherein the spiral disk is configured to apply a shearing force to the vent disk when the vent disk deforms into the cavity to facilitate the breakage of the vent disk and thereby interrupt electrical current flow between the current collector and the terminal.

8. The battery module of claim 7, wherein the spiral disk and the vent disk comprise conductive materials.

9. The battery module of claim 7, wherein a center of the spiral disk is coupled to the vent disk.

10. The battery module of claim 7, wherein the spiral disk comprises an extension portion, wherein the extension portion extends to a position over the current collector, and wherein the extension portion is coupled to the current collector.

11. The battery module of claim 7, where in the vent disk comprises a circular groove, wherein the groove comprises a score in the vent disk, a thinner area of the vent disk, or a combination thereof.

12. The battery module of claim 11, wherein the vent disk is configured to break along the groove when the pressure within the casing exceeds the threshold value.

13. The battery module of claim 7, wherein the threshold value is indicative of a pressure lower than a pressure associated with thermal runaway.

14. The battery module of claim 7, wherein the cover assembly comprises a vent formed in the cover, wherein the vent is configured to open when the pressure within the casing exceeds a second threshold value, wherein the threshold value is lower than the second threshold value.

15. The battery module of claim 7, wherein the spiral disk is laser welded to the vent disk.

16. The battery module of claim 7, wherein the spiral disk comprises one or more slits configured to rotate the spiral disk when the pressure within the casing exceeds the threshold value creating the shearing force.

17. The battery module of claim 7, wherein the spiral disk is configured to maintain contact with a portion of the vent disk after the vent disk breaks.

18. The battery module of claim 17, wherein the spiral disk is configured to hold the portion of the vent disk within the cavity after the vent disk breaks.

19. The battery module of claim 7, wherein the cover assembly comprises a terminal pad disposed outside of the cover and electrically coupled to the terminal, wherein the terminal extends through the terminal pad.

20. The battery module of claim 7, wherein the cover assembly comprises an insulative gasket disposed between the terminal and the cover and configured to prevent electrical current flow between the terminal and the cover.

21. A lithium ion prismatic battery cell, comprising:
a casing housing electrochemically active components of the lithium ion prismatic battery cell, and a cover assembly secured to the casing and comprising a cover, a terminal protruding through the cover, a current collector electrically coupled to the terminal, an insulative gasket disposed between the terminal and the cover configured to prevent electrical current flow between the terminal and the cover, a terminal pad disposed outside of the cover and electrically coupled to the terminal, wherein the terminal extends through the terminal pad, and an overcharge protection assembly disposed between the terminal and the current collector configured to interrupt current between the terminal and the current collector;
wherein the overcharge protection assembly comprises a spiral disk and a vent disk physically and electrically coupled to a center of the spiral disk, wherein the spiral disk and the vent disk comprise conductive materials, wherein the vent disk is disposed between the spiral disk and the terminal and comprises a concave structure forming a cavity between the vent disk and the terminal by the concave structure of the vent disk, wherein the vent disk is electrically coupled to the current collector via the spiral disk, wherein the vent disk comprises a circular groove and is configured to deform into the cavity and break along the circular groove when a pressure within the casing exceeds a threshold value, and wherein the spiral disk comprises one or more slits configured to rotate the spiral disk when the pressure within the casing exceeds the threshold value creating a shearing force, wherein the spiral disk is configured to apply the shearing force to the vent disk when the vent disk deforms into the cavity to facilitate the breakage of the vent disk along the circular groove and thereby interrupt electrical current flow between the current collector and the terminal.

\* \* \* \* \*